US006771699B1

United States Patent
Karaoquz et al.

(10) Patent No.: US 6,771,699 B1
(45) Date of Patent: Aug. 3, 2004

(54) METHOD FOR RAPID CARRIER-FREQUENCY OFFSET ACQUISITION USING A PERIODIC TRAINING SEQUENCE

(75) Inventors: Jeyhan Karaoquz, Norton, MA (US); Sedat Olcer, Au (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/575,576

(22) Filed: May 22, 2000

(30) Foreign Application Priority Data

May 22, 1999 (EP) .......................... 99110088

(51) Int. Cl.[7] ............................... H04B 3/46
(52) U.S. Cl. .................. 375/224; 375/228; 375/316
(58) Field of Search ................ 375/222, 231, 375/316, 325, 13, 355, 106, 224, 233, 228, 341, 326; 329/304; 370/347, 350

(56) References Cited

U.S. PATENT DOCUMENTS

| | | | | |
|---|---|---|---|---|
| 4,674,103 A | * | 6/1987 | Chevillat et al. | ............ 375/231 |
| 5,272,446 A | * | 12/1993 | Chalmers et al. | ........... 329/304 |
| 5,400,368 A | * | 3/1995 | Cheng et al. | ............... 375/354 |
| 5,768,323 A | * | 6/1998 | Kroeger et al. | ............. 375/355 |

OTHER PUBLICATIONS

K.H. Mueller and D.A. Spaulding. "Cyclic Equalization—A New Rapidly Converging Equalization Technique for Synchronous Data Communication." *B.S.T.J.*, vol. 54, No. 2, pp. 369–406, Feb. 1975.

S. Qureshi. "Fast Start-up Equalization with Periodic Training Sequences." *IEEE Trans. On Inform. Theory.* vol. IT 23, pp. 553–563, Sep. 1987.

P.R. Chevillat, D. Maiwald, and G. Ungerboeck. "Rapid Training of a Voiceband Data–Modem Receiver Employing an Equalizer with Fractional–T Spaced Coefficients." *IEEE Trans. On Commun.*, vol. CON–35, No. 9, pp. 869–876, Sep. 1987.

E.A. Lee, et al. "Digital Communications." *Kluwer Academic Publishers*, Boston, MA, 1988.

* cited by examiner

Primary Examiner—Stephen Chin
Assistant Examiner—Ted Wang
(74) *Attorney, Agent, or Firm*—Douglas W. Cameron; Anne V. Dougherty

(57) ABSTRACT

A method, encoded in a logic medium, is provided which determines a carrier-frequency offset in an output signal of a transmission system. Such a transmission system uses a periodic training sequence having an associated spectrum. A measured spectral characteristic of an overall channel and an ideal spectral characteristic are given as inputs. The method comprises (a) determining a frequency shift in the overall channel characteristic by obtaining a spectral characteristic of the measured channel, and (b) utilizing the amount by which the measured spectral characteristic is shifted with respect to the ideal spectral characteristic to estimate the carrier frequency offset.

11 Claims, 4 Drawing Sheets

METHOD FOR RAPID CARRIER-FREQUENCY OFFSET ACQUISITION USING A PERIODIC TRAINING SEQUENCE

BACKGROUND OF THE INVENTION

Rapid receiver training is key for the efficient design of many communication systems. For example for voiceband modems, rapid start-up is greatly desirable. In systems where burst-mode transmission is employed, as in upstream transmission in two-way hybrid fiber coax cable TV (HCF-CATV) systems, fast acquisition of the adjustable receiver parameters using only short preambles allows the minimization of communication overhead.

Among various methods that have been proposed to simplify or otherwise improve rapid receiver training, several rely on the utilization of periodic, or cyclic, training sequences. This is described in, for example, K. H. Mueller et al. "Cyclic equalization—A new rapidly converging equalization technique for synchronous data communication", $B.S.T.J.$, Vol 54N° 2, pp. 369–406, February 1975 and S. Qureshi, "Fast start-up equalization with periodic training sequences", $IEEE\ Trans.\ on\ Inform.\ Theory$, Vol. IT 23, pp. 553–563, September 1977. Specific periodic sequences can be obtained from pseudo-random sequences, chirp sequences, constant amplitude zero autocorrelation (CAZAC) sequences, or other suitable sequences.

The properties of the employed sequences are exploited at the receiver for fast calculation of estimates of adjustable receiver parameters. Initial estimates are then refined during subsequent receiver operations using adaptive adjustment methods.

The fast acquisition of carrier-frequency offset is a problem that generally coexists with the problems of fast equalizer computation. According to P. R. Chevillat et al, "Rapid Training of a Voiceband Data-Modem Receiver Employing an Equalizer with fractional-T Spaced Coefficients", $IEEEE\ Trans\ on\ Commun$, Vol. COM-35, N° 9, pp. 869–876, September 1987, both problems are solved by using a short cyclic preamble containing a CAZAC sequence. The method according to Chevillat et at, (the "Chevillat method") is, however, limited to those cases for which the carrier-frequency offset does not exceed in absolute value 1/2MT Hz, assuming that one period of the CAZAC sequence extends over M symbol intervals T.

Let us denote the rate at which the transmit symbols are generated as 1/T and assume that the received signal is sampled at a rate of q times per symbol interval T, with q being an integer. The signal samples are fed into the delay line of an equalizer with a T/q tap spacing. We assume as well that we have an equalizer with a fractional-T tap spacing i.e., T/q tap spacing with q>1. Following the notation found in the glossary attached, which may be found in Chevillat et al., the samples in the equalizer delay line at time nT are given by $$x_{nq-i} = u_{nq-i} e^{j2\pi\Delta_f(nq-i)T/q},$$

$$i = 0, 1, \ldots, Mq-1 \qquad (1)$$

where we have assumed that the delay line has a total time span of MT. In the above equation, $u_{nq-i}$ denotes the transmit signal after filtering by the channel transfer function and sampling, and $\Delta_f$ is an unknown carrier-frequency offset. The effect of noise has been ignored.

For fast receiver training, a cyclic preamble, obtained from the repetition of a specific symbol sequence of duration MT, is transmitted. In this case, the training signal has spectral lines spaced at intervals of 1/MT Hz. Also one full period of the channel output signal is always stored in the equalizer delay line. This can be used to efficiently compute the values of the equalizer coefficients needed at the receiver, as explained, e.g., in Mueller et al, Qureshi and Chevillat et al.

According to the Chevillat method, the periodic nature of the preamble is further exploited to produce an estimate of the carrier-frequency offset $\Delta_f$. The Chevillat method utilizes the fact that once a full period of the channel output signal is found in the equalizer delay line, then $$u_{nq-Mq-i} = u_{nq-i} \qquad (2)$$

and the samples entering and leaving the equalizer delay line only differ in a phase rotation of $2\pi\Delta_f MT$. Since phase-difference magnitudes larger than $\pi$ cannot be distinguished, this requires that phase rotation induced by carrier-frequency offset satisfies the following equation, $$|2\pi\Delta_f MT| < \pi, \qquad (3)$$

which implies that the carrier frequency offset must be limited to $$|\Delta_f| < \frac{1}{2MT}. \qquad (4)$$

Therefore, what is needed is a method which permits the acquisition of carrier-frequency offsets significantly larger than 1/2MT, but which use the same cyclic preamble.

SUMMARY OF THE INVENTION

A method, encoded in a logic medium, is provided which determines a carrier-frequency offset in an output signal of a transmission system. The transmission system uses a periodic training sequence having an associated spectrum. Given a measured spectral characteristic of an overall channel and an ideal spectral characteristic, the method is able to calculate an estimate of carrier-frequency offset by performing two acts. In a first act, the method determines a frequency shift in the overall channel characteristic by obtaining a spectral characteristic of the measured channel. In a second act, the method utilizes the amount by which the measured spectral characteristic is shifted with respect to the ideal spectral characteristic to estimate the carrier frequency offset.

In a feature of the invention, the method estimates the earlier frequency offset using a definition that the carrier frequency offset is the sum of a gross frequency offset and a partial offset. The gross frequency offset is a frequency offset of an amount that is an integer multiple of a unitary spacing on a frequency axis between two consecutive spectral lines in the spectrum of the periodic training sequence. The partial frequency offset is a frequency offset that is smaller, in absolute value, than half the unitary spacing on the frequency axis between two consecutive spectral lines in the spectrum of the employed periodic training sequence. The partial frequency offset is determined by the Chevillat method.

In another feature of the invention, the frequency shift due to the gross frequency offset is estimated by evaluating a mean-square error between the frequency characteristic computed for the overall channel and all possible characteristics obtained by successively shifting the ideal spectral characteristic by a unitary, discrete spacing until a minimum mean-square error is achieved. The number of unitary, discrete spacings away from the ideal spectral characteristic yields an estimate of the carrier-frequency offset.

In another feature of the invention, the frequency shift is obtained by performing four acts. In a first act from the ideal spectral characteristic, the method identifies a value equal to the largest number of consecutive discrete Fourier transform points for which the value of the spectral energy is essentially zero, thus defining a set of consecutive discrete Fourier transform points each having an associated magnitude and yielding, as a consequence, a width of a spectral window. In a second act, from the measured spectral characteristic, the method computes a sum of the magnitudes of all points in the set of consecutive discrete Fourier transform points found in the spectral window width determined in the first act, for all possible such windows. In a third act, the method determines the position of a set of consecutive discrete Fourier transform points, also known as the position of the spectral window, for which the sum of the magnitudes of the discrete Fourier transforms points is a minimum. In a fourth act, the method utilizes the amount by which the set of consecutive discrete Fourier transform points in the third act is shifted with respect to the set of consecutive discrete Fourier transform points in the first act to estimate the carrier-frequency offset.

In another feature of the invention, an equalizer is computed first, thus permitting a reliable calculation of the carrier frequency offset of the overall channel by employing an equalized characteristic.

In another feature of the invention, the logic medium is a computer-readable medium.

In another feature of the invention, the logic medium is a logic element having logic gates formed on a tangible medium.

In another feature of the invention, the frequency characteristic is a raised-cosine frequency characteristic.

An advantage of the invention is that significantly larger frequency-offset values can be acquired using the same cyclic preamble.

Another advantage of the invention, the method is simple to implement and useful in a variety of systems, for example, in HFC-CATV systems. where large carrier-frequency offset due to frequency stacking at the fiber node must be compensated, especially during upstream transmission in contention mode.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings.

DETAILED DESCRIPTION OF THE INVENTION

Figure 1:
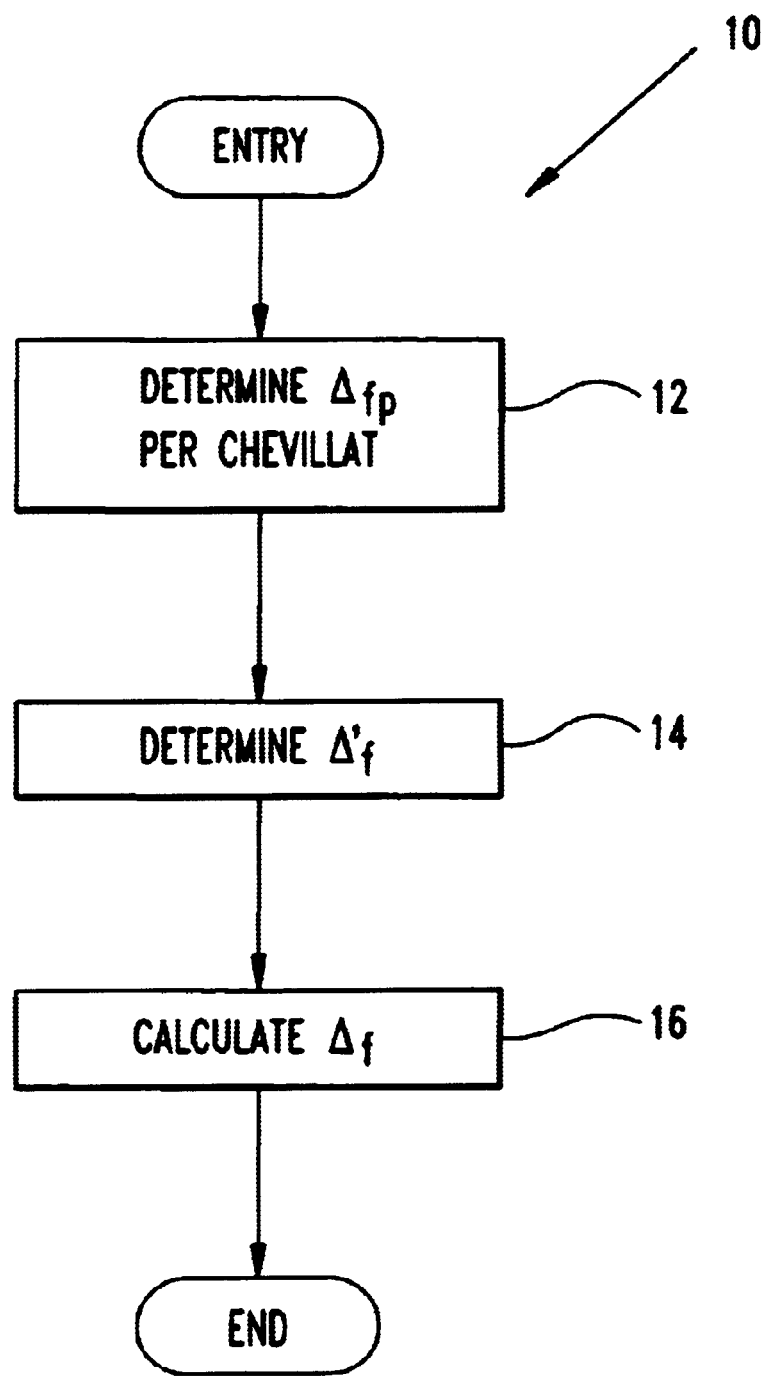
FIG. 1 is a block diagram of the method of the invention.
Figure 4:
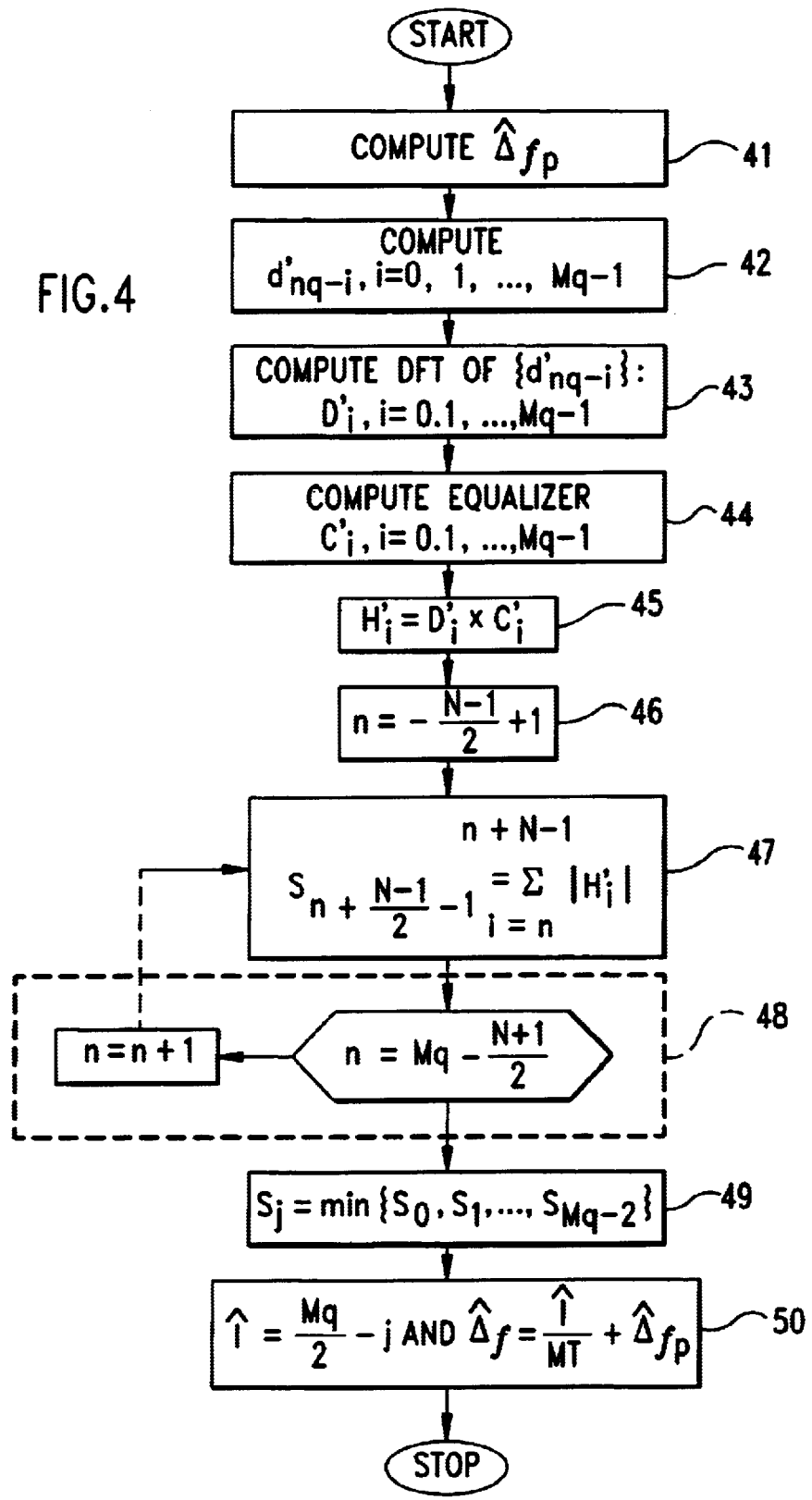
FIG. 4 is a detailed flowchart of the method of the invention.

Referring to FIG. 1, a method 10, encoded in a logic medium such as a computer readable medium or a logic element, is provided which determines a carrier-frequency offset $\Delta_f$ in an output signal of a transmission system. The transmission system uses a periodic training sequence having an associated spectrum. Given a measured spectral characteristic $H'_m$ of the overall channel representing the transmission system and an ideal spectral characteristic $H^I_m$, the method 10 is able to calculate an estimate of carrier-frequency offset $\Delta_f$ by (1) obtaining a spectral characteristic of the measured channel (this is accomplished according to the first five acts of the method 10 as depicted in FIG. 4), and by (2) utilizing the amount by which the measured spectral characteristic is shifted with respect to the ideal spectral characteristic to estimate the carrier frequency offset (this is accomplished according to the last four acts depicted in FIG. 4).

Referring to FIGS. 1 and 2a to 2c, the method 10 performs essentially two basic acts. In a first act 12, the frequency offset $\Delta_{f_p}$ is determined using the Chevillat method. In a second act 14, after $\Delta_{f_p}$, the portion of the frequency offset that is smaller in absolute value than 1/(2MT), has been removed from the received signal using the Chevillat method, the method 10 determines a gross frequency offset $\Delta'_f$. In a third act 16, the method 10 adds the gross frequency offset $\Delta'_f$ to the partial frequency offset $\Delta_{f_p}$, the result being an estimate of carrier frequency offset $\Delta_f$. The partial frequency offset $\Delta_{f_p}$ is a frequency offset that is smaller, in absolute value, than half the unitary spacing 1/MT on the frequency axis 18 between two consecutive spectral lines at frequencies m and m+1 in the discrete spectrum of the employed periodic training sequence.

The method 10 estimates the carrier frequency offset $\Delta_f$ using a definition that the carrier frequency offset is the sum of the gross frequency offset $\Delta'_f$ and the partial frequency offset $\Delta_{f_p}$. With the estimate of carrier-frequency offset $\Delta_f$, the effect of the frequency offset on the output signal of the transmission system can be removed.

The method 10 functions according to the following assumptions, equations and implementations.

For fast receiver training, the transmitter transmits a periodic training sequence, or cyclic preamble of period MT, where T is the modulation interval and M is a positive integer. In this case, the spectrum of the training signal has spectral lines spaced at integer multiples of the frequency 1/MT Hz. At the receiver, the received signal is sampled q times per modulation interval T, where q represents a positive integer, also known as the signal oversampling factor. The obtained signal samples are stored in a delay line of time span MT. The samples in the delay line at time nT are given by Equation 1, above, where $u_{nq-i}$ denotes the transmit signal after filtering by the channel transfer function and $\Delta_f$ is an unknown carrier-frequency offset.

The carrier-frequency offset $\Delta_f$ may be expressed as $$\Delta_f = \frac{l}{MT} + \Delta_{f_p} = \Delta'_f + \Delta_{f_p}. \tag{5}$$

In this formulation, the portion $\Delta_{f_p}$ of the frequency offset is assumed to bounded as $$|\Delta_{f_p}| < \frac{1}{2MT} \text{ Hz,} \qquad (6)$$

and l is an integer such that $|l|<l_{max}$ and $l_{max}$ is the largest value for which $$|\Delta_f| < \frac{q}{2T} \text{ Hz.} \qquad (7)$$

This condition on $\Delta_f$ is justified below.

Let us first examine the case where the carrier-frequency offset $\Delta_f$ is smaller in absolute value than 1/2MT. In this case, an estimate of the carrier-frequency offset $\Delta_f$ can be obtained as explained according to Chevillat et al., and estimates $\{d_{nq-i}\}$ of the above-defined signals $\{u_{nq-i}\}$ can be determined by removing the phase rotation introduced by carrier-frequency offset from the signals in the equalizer delay line:

$$d_{nq-i} = x_{nq-i} e^{j2\pi \Delta_f i T/q} \ m=0, 1, \ldots Mq-1 \qquad (8)$$

where $d_{nq-i}$ is an estimate of $u_{nq-i}$, $x_{nq-i}$ is a signal stored in the delay line;

j=square root of −1; and i and m are an integer indexes.

The discrete Fourier transform ("DFT") of Mq consecutive signal values $d_k$, k=0, 1, . . . , Mq−1 is given by $$D_m = \sum_{k=0}^{Mq-1} d_k e^{-j2\pi mk/Mq} \quad m = 0, 1, \ldots, Mq-1 \qquad (9)$$

where $D_m$ is the spectral characteristic of the received noiseless signal from which the carrier-frequency offset has been removed, at Mq equally spaced points in the frequency range $$\left[-\frac{q}{2T}, \ +\frac{q}{2T}\right],$$

where k is an integer index.

Then, the Mq-point DFT of the equalizer coefficients $c_k$, k=0, 1, . . . , Mq−1

$$C_m = \sum_{k=0}^{Mq-1} c_k e^{-j2\pi mk/Mq} \quad m = 0, 1, \ldots, Mq-1 \qquad (10)$$

can be computed according to Chevillat et al.

The Mq point DFT (a spectral characteristic that assumes values at Mq discrete frequencies) of the signal at the output of the overall system, including the equalizer, is given by $$H_m = D_m \cdot C_m \ m=0, 1, \ldots Mq-1 \qquad (11).$$

$H_m$ represents Mq equally spaced discrete points in the frequency interval $$\left[-\frac{q}{2T}, \ +\frac{q}{2T}\right].$$

Because the equalizer coefficients are computed for ideal equalization at the discrete frequency points, the $H_m$s satisfy the Nyquist criterion: when spectral folding is performed, the characteristic obtained in the frequency range of $$\left[-\frac{1}{2T}, \ +\frac{1}{2T}\right]$$

is flat. Note that this criterion is satisfied directly by the signal at the output of the overall system in the case where the cyclic preamble is constructed from a CAZAC sequence for which all DFT spectral components are identical. FIG. 2b illustrates the spectral characteristic (of Equation 11) of a transmission system in which the partial frequency offset has been removed and where l=0.

Let us now consider the general case where l≠0 in the expression for $\Delta_f$. We recognize immediately that if the Chevillat method is applied, only the $\Delta_{f_p}$ portion of the carrier-frequency offset can be determined and its effect removed, since the phase rotation of $2\pi l$ due to $\Delta'_f$ will not be "seen" by comparing the signal samples entering and leaving the equalizer delay line of length (i.e., time span) of MT. Therefore, if the frequency-offset term $\Delta_{f_p}$ is removed from the signal samples in the delay line following Equation 8, the signals $\{d'_{nq-i}\}$ will be obtained instead of $\{d_{nq-i}\}$, and the $\{d'_{nq-i}\}$ now represent the estimate of the signals $$u_{nq-i} e^{j2\pi \Delta'_f(nq-i)T/q}, \ m=0, 1, \ldots Mq-1 \qquad (12)$$

The signals $\{u_k\}$ appear as being multiplied by a periodic signal having a period of exactly MT/l. Hence, in the frequency domain, the spectral values $D'_m$ are shifted versions of the $D_m$'s by an integer of frequency points.

$$D'_m = D_{m-l} \qquad (13)$$

The Mq point DFT of the equalizer coefficients $C'_m$ can now be calculated according to the Chevillat method. As a result, the Mq-point DFT of the signal at the output of the overall system is obtained as $$H'_m = D'_m \cdot C'_m = D_{m-l} \cdot C_{m-l} \ m=0, 1, \ldots Mq-1 \qquad (14)$$

where $H'_m$ is the overall measured spectral characteristic.

Note that due to the cyclic nature of the training sequence, in Equations 13 and 14, the sub-indices have to be understood in a modulo-Mq sense.

Figure 2A:
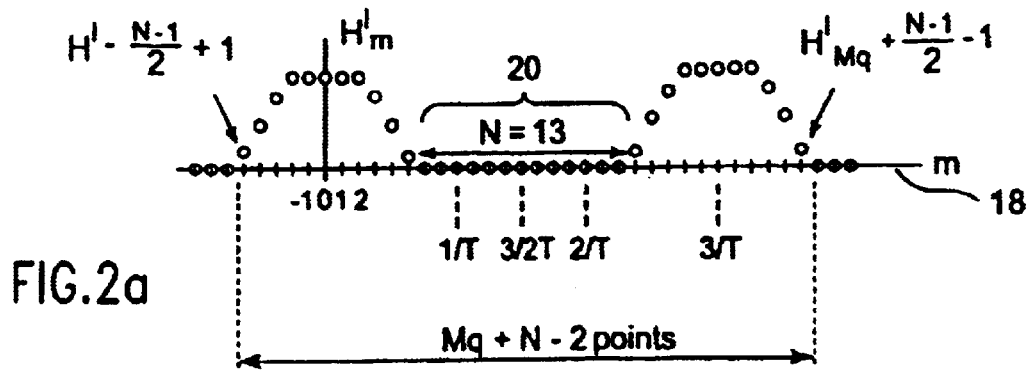
FIG. 2a is a graph of the ideal channel characteristic with no frequency offset.
Figure 2B:
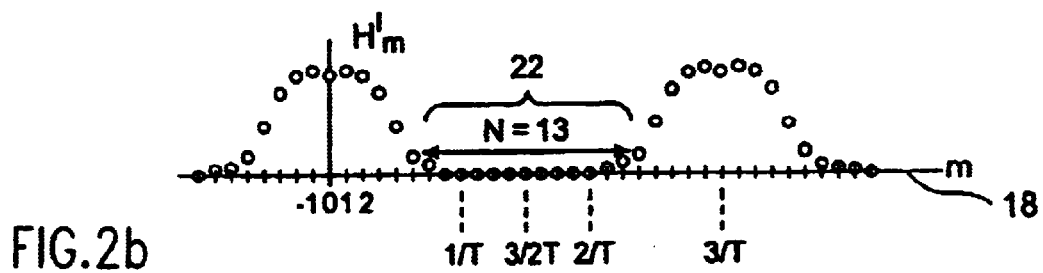
FIG. 2b is a graph of the measured channel characteristic with no frequency offset (l=0).
Figure 2C:
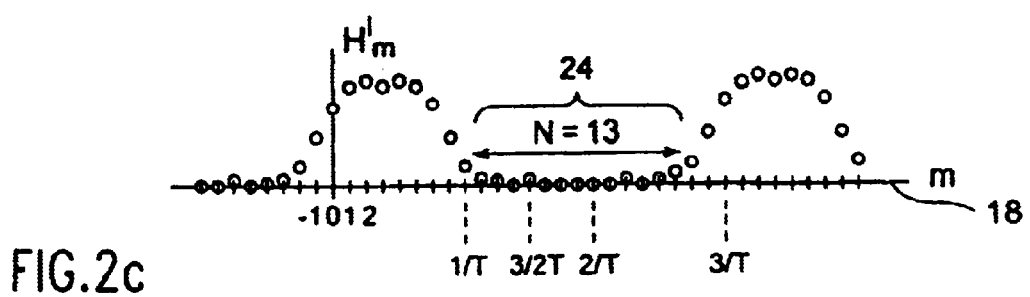
FIG. 2c is a graph of the measured channel characteristic with frequency offset (l=3).

We see that due to carrier-frequency offset $\Delta'_f$ the overall symbol response shifts by exactly l DFT points (see FIG. 2c where l=3). Therefore, the portion $\Delta'_f$ of the carrier-frequency offset $\Delta_f$ can be found by determining the amount of shift 1/MT present in the obtained spectral characteristic $H'_m$. Note that the spectral shifts 1/MT (see FIG. 2) beyond ±q/2T cannot be unambiguously differentiated by this method, hence the condition imposed above on $\Delta_f$ by Equation 7.

We next discuss the problem of determining the value of the shifts l along the frequency axis. To this end, we consider the familiar situation where overall signal spectrum shaping towards a raised-cosine characteristic as described in Lee et al. (*Digital Communications*, Klower Acedemic Publishers, Boston 1988) is desired. In this case, the overall measured spectral characteristic $\{H'_m\}$ will approximate a raised-cosine characteristic shifted in frequency due to non-zero gross carrier-frequency offset $\Delta'_f$. Also, the $H'_m$'s will satisfy the above mentioned Nyquist criterion.

To estimate the frequency shift 1/MT, a first embodiment of the method 10 consists of evaluating the mean-square error ("MSE") between the frequency characteristic $\{H'_m\}$ computed for the overall system and all possible characteristics obtained by shifting the ideal raised-cosine frequency characteristics by n/MT, n being an integer such that $|n|<1_{max}$ (i.e., by an integer multiple of a unitary, discrete spacing 1/MT). The value of n for which the minimum MSE is achieved gives an estimate of 1, hence the amount of the carrier-frequency offset $\Delta'_f$. This embodiment of the method 10 is sometimes computationally intensive.

A simple and reliable submethod used to determine the frequency offset is described as follows:

a) denote by N the largest number of consecutive DFT points in the frequency range $$\left[0, \frac{q}{T}\right]$$

for which the spectral energy in the raised-cosine frequency characteristic $H^I_m$ is zero, or small; since the employed excess bandwidth, or roll-off factor of the raised-cosine characteristic, is known, N can be accurately specified.

b) from the obtained spectral characteristic $\{H'_m\}$, compute the sum of the magnitudes of all N consecutive DFT points $H'_m$ and determine the position of the N points which results in the minimum sum. The amount by which this set of N points is shifted with respect to the set of N points defined for the ideal raised-cosine characteristic $H^I_m$ gives an estimate of the value of the frequency shift 1/MT. Note that since $\{H'_m\}$ is periodic with period q/T, the number of sets of N points to consider for the above computations is finite.

Referring now to FIGS. 2a and 2b, the overall channel spectral characteristic for the particular case in which Mq is even and a spectral window of odd length N around the frequency q/2T is shown. FIG. 2a is a graph of spectral energy on the frequency axis of the ideal channel characteristic $H^I_m$ with no frequency offset. FIG. 2b is a graph of spectral energy on the frequency sets of the measured channel characteristic with no frequency offset (l=0). The values M=8 and q=3 are assumed. The cases where Mq is odd and/or N is even are treated separately.

The ideal characteristic $H^I_m$ (e.g., a raised-cosine characteristic) for which the largest window 20 with zero spectral energy consists of the N=13 points is shown in FIG. 2a. The measured spectral characteristic $H'_m$ for the case in which the partial frequency-offset $\Delta_{f_p}$ has been removed and there is no gross frequency-offset $\Delta'_f$ (i.e., l=0) is shown in FIG. 2b. In this case, the spectral window 22 of width N for which the sum of the magnitude of its spectral components is minimum is the same window as the window 20 shown in FIG. 2a. The measured spectral characteristic $H'_m$ for the case in which the partial frequency-offset $\Delta_{f_p}$ has been removed and there exists a gross frequency offset (l=3), is shown graphically in FIG. 2c (as in FIGS. 2a and 2b, spectral energy vs. frequency, M=8, q=3, N=13). In this case, the spectral window 24 of width N for which the sum of the magnitude of its spectral components is a minimum is a window that is shifted by m=3 along the discrete frequency axis 18 as compared to the case shown in FIG. 2a. Due to the periodic nature of the discrete channel characteristics and because frequency shifts that can be estimated are limited in absolute value to 3/2T, the frequency components $H'_m$ that have to be considered to perform the computations for the estimation of l extend from m=1−(N−1)/2 to m=−1+Mq+(N−1)/2.

Figure 3:
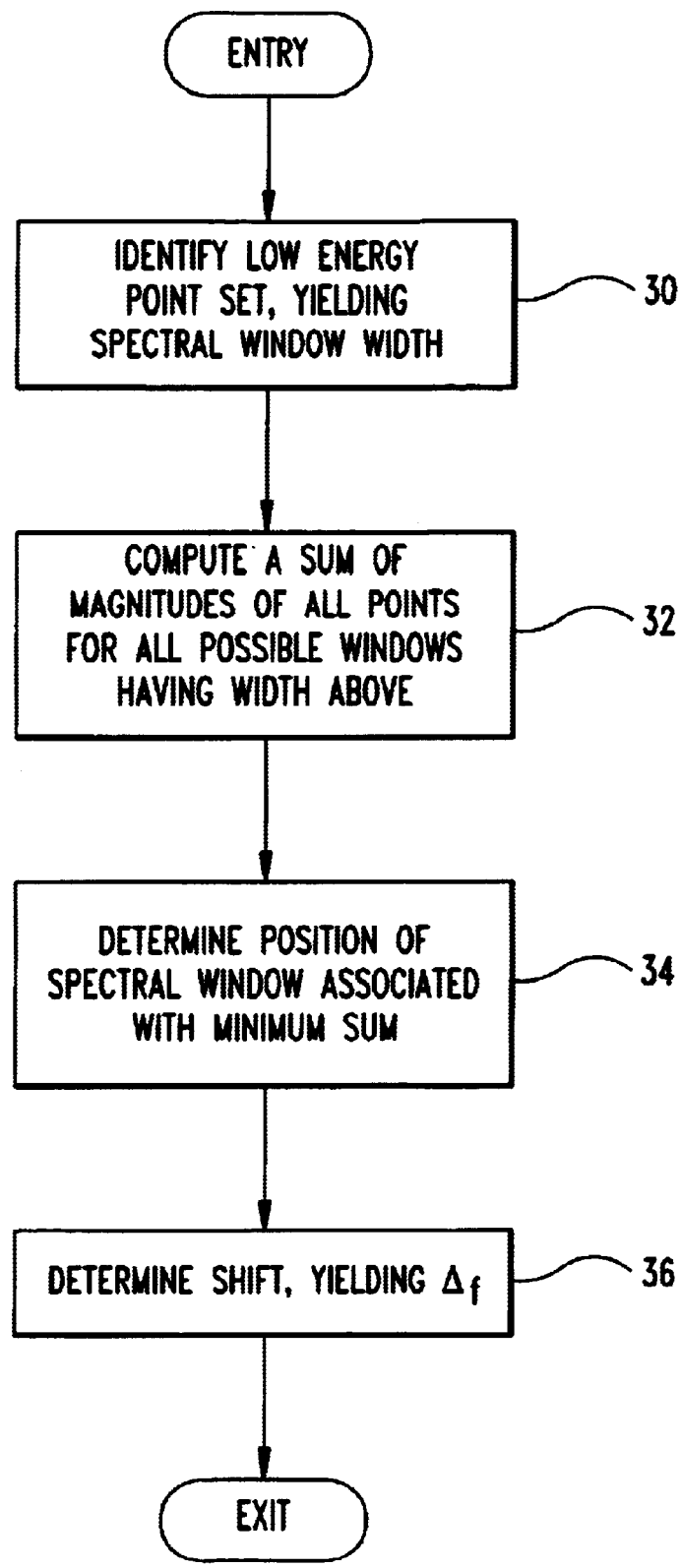
FIG. 3 is a flowchart of the method of the invention.

Now referring to FIG. 3, wherein a second embodiment of the invention is shown, the method 10 obtains the frequency shift 1/MT by performing four acts 30, 32, 34 and 36. In the first act 30, from the ideal spectral characteristic $H'_m$, the method 10 identifies a value equal to the largest number of consecutive discrete Fourier transform points for which the value of the spectral energy is essentially zero, thus defining a set F of consecutive discrete Fourier transform points each having an associated magnitude and yielding, as a consequence, a width of a spectral window N. Referring to the examples of FIGS. 2a to 2c, the set F consists of the N=13 points shown in FIG. 2a. In the second act 32, from the measured spectral characteristic $H'_m$, the method 10 computes a sum of the magnitudes of all points in the set of consecutive discrete Fourier transform points found in the spectral window width N determined in the first act 30, for all possible such windows. Again referring to the example of FIGS. 2a to 2c, this consists of computing the sum of the magnitudes of all points for all possible windows of width N=13 in the interval extending from m=1−(N−1)/2 to m=−1+Mq+(N−1)/2 (also shown in blocks 46 to 48 of FIG. 4). In the third act 34, the method 10 determines the position of a set F' of consecutive discrete Fourier transform points, also known as the position of the spectral window for which the sum of the magnitudes of the DFT points is a minimum (also shown in block 49 of FIG. 4). Referring to the examples of FIGS. 2a to 2c, this corresponding to the position of the N=13 points in FIG 2b (case l=0) and FIG. 2c (case l=3). In the fourth act 36, the method 10 utilizes the amount by which the set F' of consecutive discrete Fourier transform points in the third act 34 is shifted with respect to the set F of consecutive discrete Fourier transform points in the first act 30 to estimate the carrier-frequency offset $\Delta_f$ (also shown in block 50 of FIG. 4). Referring to the examples of FIGS. 2a to 2c, the shown set of N=13 points in FIG. 2b (and respectively, FIG. 2c) is shifted by l=0 (l=3 in FIG. 2c) with respect to the set of N=13 points shown in FIG. 2a.

Referring now to FIG. 4, a detailed flow chart of a method 10 is shown which performs ten acts 41 to 50. In acts 41 to 45, the computation of the spectral characteristic $\{H'_m\}$ of the overall channel is described. In order to estimate the gross carrier-frequency offset $\Delta'_f$, spectral samples $H'_m$ in an interval [0, +q/T] are cyclically extended (in FIGS. 2a to 2c, within a window of width Mq+N−2 points) and the energy of all adjacent N-point samples is computed. It is assumed that Mq is even and that the number of points N considered around q/2T is odd. The cases where Mq is odd and/or N is even are treated similarly.

In a first act 41, the method 10 computes an estimate of the partial frequency offset $\Delta_{f_p}$ defined in Equation 5, by using the Chevillat method. In a second act 42, the method 10 introduces the estimate of $\Delta_{f_p}$ into Equation 8 above, obtaining $d'_{nq-i}=0, 1, \ldots, Mq-1$, which represents the equalizer delay-line signals from which the partial frequency offset $\Delta_{f_p}$ has been removed. In a third act 43, the method 10 computes the discrete Fourier transform ("DFT") of $d'_{nq-i}=0, 1, \ldots, Mq-1$, yielding the Mq frequency-domain values $D'_i$, i=0, 1, \ldots, Mq−1. In a fourth act 44, using $D'_i$, i=0, 1, \ldots, Mq−1, the method 10 computes the discrete spectral characteristic of the equalizer $C'_i$, i=0, 1, \ldots, Mq−1 by applying the Chevillat method. In a fifth act 45, the method 10 computes $H'_i=D'_i\times C'_i$, i=0, 1, \ldots Mq−2, which represent the spectral characteristic of the overall transmission channel, including the equalizer, at Mq discrete frequency values. In a sixth act 46, the method 10 initializes the counter n to the value n=−(N−1)/2+1, which corresponds to the smallest value of the frequency index i for which the channel characteristic $H'_i$ must be considered. In a seventh act 47, the method 10 computes the sum of the magnitudes of the $H'_i$'s, starting from $H'_n$, within a window width N. The sub-index i must be interpreted in a modulo-Mq sense. In an eighth act 48, if n=Mq−(N+1)/2, the method 10 computes the sum of the magnitudes of the H'$_i$'s, within a window of width N, and then proceeds to the following act. If not, then the method 10 increments n up one unit and goes back to the previous act. In a ninth act 49, the method 10 finds $S_j$, the minimum of $S_o, S_1, \ldots S_{Mq-2}$. The index j indicates the position of the window of width N for which the sum of the magnitudes of the H'$_i$'s is smallest. In a tenth act 50, the method 10 subtracts the integer j from the integer Mq/2, which is the value that must be assumed by j in case Δ'f=0. This difference provides an estimate of the integer l defined in Equation 5, above, yielding an estimate of the frequency offset Δ'f. Finally, using the result of the computation in act one 41, an estimate of the total frequency offset Δf is found.

In an alternate embodiment of the method 10, an equalizer is computed first, thus permitting a reliable calculation of the carrier frequency offset Δf of the overall channel by employing an equalized characteristic (also shown in block 45 of FIG. 4).

It should be noted that the logic medium may be any medium that can be read by a computer or, optionally the method can be cut into hardware such as in a logic element with logic gates formed on some tangible medium such as an integrated circuit.

Further, the frequency characteristic is optionally a raised-cosine frequency characteristic.

An advantage of the invention is that the range of allowable carrier frequency offset Δf is $$\left[-\frac{q}{2T}, +\frac{q}{2T}\right],$$

which is considerably larger than the range of $$\left[-\frac{1}{2MT}, +\frac{1}{2MT}\right]$$

that must be assumed when using the Chevillat method. Thus, significantly larger frequency-offset values can be acquired using the same cyclic preamble. The range can further be increased by increasing the oversampling factor q, whereas according to Chevillat et al., the range is fixed.

Another advantage of the invention, the method 10 is simple to implement and useful in a variety of systems, for example, in HFC-CATV systems, where large carrier-frequency offsets Δf due to frequency stacking at the fiber node must be compensated, especially during upstream transmission in contention mode.

Further, because rapid receiver training usually involves fast initial computation of both carrier-frequency offset Δf and equalizer coefficients $c_k$, another advantage of the invention is that the quantities $\{D_m\}$ and $\{C_m\}$ have to be evaluated in order to compute the equalizer coefficients. They are thus directly available for the computation of carrier-frequency offset following the disclosed method. As a result, the additional complexity introduced for carrier-frequency offset acquisition is small.

GLOSSARY OF TERMS

Adjacent N spectral samples: the values assumed by a spectral characteristic at N adjacent discrete frequency points.
Adjustable receiver parameters: parameters like equalizer coefficients, signal sampling phase, carrier-frequency.
Carrier-frequency offset: the difference between the frequency of the carrier used in the transmitter for signal modulation and the carrier frequency used in the receiver for signal demodulation.
Cyclic preamble: a periodic preamble = a periodic training sequence.
Δ$_f$: the carrier frequency offset (defined in Equations 5 and 6 in the disclosure).
Δ'f: the gross frequency offset.
Δf$_p$: the partial frequency offset.
DFT: the Fourier transform of a discrete time-domain signal.
Discrete frequency points: frequency values that are equal to an integer multiple of a given frequency.
Equalizer: a filter used to filter the received signal for the purpose of mitigating the distortion introduced by the channel.
Equalizer coefficients: the values by which the signal samples in the equalizer delay line have to be multiplied to compute the equalizer output signal.
Equalizer computation: computation of the value of the coefficients of the equalizer filter.
Equalizer delay line: shift register (first in first out) that stores the signal samples that are used to compute the equalizer output signal. If the equalizer has Mq coefficients (hence also Mq signals are stored in the delay line) and if delay line samples have been taken at the rate of q/T, then the time span of the equalizer is Mq/(q/T)=MT.
Excess bandwidth: the bandwidth over the frequency $f$=1/2T where nonzero spectral components exist. For zero excess bandwidth, there is no spectral components above the frequency 1/2T. For non zero excess bandwidth, the spectral components roll-off towards zero around 1/2T Hz. How fast this roll-off takes place is defined by the roll-off factor (of the raised-cosine characteristic).
Frequency response: the Fourier transform of the impulse response of a system. Here we work with the frequency response (= spectral characteristic) of the equalizer ($C_m$), the overall channel ($H_m$), etc.
Frequency axis: horizontal axis used to represent a function in the frequency domain.
Frequency interval: a portion of the frequency axis.
Full period of the channel output signal: if the periodic channel input signal has a period MT, then the signal at the output of the channel is also periodic with period MT(= full period).
HFC-CATV: hybrid fiber-coax cable TV.
$H_m$ is defined in Equation 11, its physical meaning is also indicated.
H'$_m$ is the spectral characteristic of the signal at the output of the overall system.
$l_{max}$ specifies the maximum of the frequency offset term Δ'$_f$.
"l" is an integer that specifies the value of the "gross" frequency offset (=l/MT).
Logic medium: is a medium, such as a computer-readable medium or a logic element which is encoded with logic gates, formed on a tangible medium. The logic gates include those devices used in hardware such as silicon chips or wafers or integrated circuits, or that are capable of fixing the logical processes of the method in a form which permits execution of the method by a processor.
Modulo-Mq: let A>B be two integers. Write A=bB+c, where b and c are also integers. Then A is equal to c modulo B.
Mq represents the size of the various DFTs.
Mq-point DFT: to compute the DFT, Mq time-domain signal samples are taken. The DFT then gives a periodic spectral characteristic which also has Mq points within one period.
"nq": denotes the time index for the first (most recent) signal sample in the delay line at time nT.
Nyquist criterion: if a sampled channel impulse response has a frequency characteristic equal to 1, then it is said to satisfy the Nyquist criterion.

Overall signal spectrum: the Fourier transform of the impulse response of the overall system.

Overall system: refers to the physical communication channel from the transmitter to the receiver output. It includes all digital and analogue filtering in the transmitter, the channel itself, and all analogue and digital filtering in the receiver.

Periodic training sequence: preamble that is a periodic signal.

Phase rotation: assume a carrier frequency offset of $\Delta_f$ Hz. Then a sine wave of frequency $\Delta_f$ goes through a phase rotation (in the complex plane) of $2\pi \Delta_f T$ radians after a time interval of T seconds.

Preamble: a signal that is known to the receiver and that is sent by the transmitter prior to sending data so that the receiver can adjust its parameters (and be ready to best detect the subsequently received data).

Raised-cosine frequency characteristic: the frequency characteristic of an often used impulse response that satisfies the Nyquist criterion.

Rapid receiver training adjustment of the receiver parameters through a set of submethods that requires a small amount of computation time.

Set of N points: set made up of N (here: spectral) points or components.

Signal samples: see above: the equalizer delay line is a first-in-first-out buffer or register.

Spectral characteristic: see above.

Spectral folding: the mechanism by which the spectral components of a signal add up due to the fact that the time-domain signal is sampled.

Spectral energy is the sum of the squared absolute values of the frequency components (in a given window). Note that in FIG. 4, act 47, we use the sum of the magnitudes instead of the magnitudes squared, but both approaches clearly give the same result.

Spectral lines: the Fourier transform of a periodic time-domain signal is a discrete (non-continuous) function: the function assumes values only at a discrete frequency points (if signal period is MT seconds, than the discrete frequency points are spaced by 1/MT Hertz), to which one refers as spectral lines.

Spectral shifts refer to shifting of a frequency domain function along the frequency axis.

T is the symbol or modulation interval (the time it takes at the transmitter to send one transmit symbol). Its inverse, 1/T, is the modulation rate. At the receiver, the received signal can be sampled at the rate of 1/T samples per second, or faster at the rate of q/T. Then q is the oversampling factor. For example if q=2, the received signal is sampled twice during T seconds.

Tap spacing T/q: the received signal is sample at the rate of q/T samples per second. These samples are shifted through a shift register (in order to store them). One new sample is shifted in every T/q seconds. Hence the samples are "T/q spaced". These samples are each multiplied by a filter coefficient (tap coefficient) to compute the filter (equalizer) output. The filter is thus said to have "T/q tap spacing".

Transmit symbol: a value (e.g. voltage) that represents information symbols.

Having thus described the invention, what is claimed is:

1. A method for determining a carrier-frequency offset in an output signal of a transmission system, given an ideal spectral characteristic, the method comprising
   (a) obtaining a spectral characteristic of the measured channel by using a periodic training sequence having an associated spectrum, and
   (b) determining a frequency shift in the overall channel characteristic by utilizing the amount by which the measured spectral characteristic is shifted with respect to the ideal spectral characteristic to estimate the carrier frequency offset.

2. The method of claim 1 wherein the method estimates the carrier frequency offset using a definition that the carrier frequency offset is the sum of a gross frequency offset and a partial frequency offset, the gross frequency offset being a frequency offset of an amount that is an integer multiple of a unitary spacing on a frequency axis between two consecutive spectral lines in the spectrum of the periodic training sequence, and the partial frequency offset, determined by the Chevillat method, being a frequency offset that is smaller, in absolute value, than half the unitary spacing on the frequency axis between two consecutive spectral lines in the spectrum of the employed periodic training sequence.

3. The method of claim 2 wherein the frequency shift due to the gross frequency offset is estimated by evaluating a mean-square error between the frequency characteristic computed for the overall channel and all possible characteristics obtained by successively shifting the ideal spectral characteristic by a unitary.

4. The method of claim 1 wherein the frequency shift is obtained by the steps of:
   (a) from the ideal spectral characteristic, identifying a value equal to the largest number of consecutive discrete Fourier transform points for which the value of the spectral energy is essentially zero, thus defining a set of consecutive discrete Fourier transform points each having an associated magnitude and yielding, as a consequence, a width of a spectral window;
   (b) from the measured spectral characteristic, computing a sum of the magnitudes of all points in the set of consecutive discrete Fourier transform points found in the spectral window width determined in (a), and for all possible such windows;
   (c) determining the position of a set of consecutive discrete Fourier transform points, also known as the position of the spectral window, for which the sum of the magnitudes of the DFT points is a minimum; and
   (d) utilizing the amount by which the set of consecutive discrete Fourier transform points in (c) is shifted with respect to the set of consecutive discrete Fourier transform points in (a) to estimate the carrier-frequency offset.

5. The method of claim 2 wherein the frequency shift is obtained by the steps of:
   (a) from the ideal spectral characteristic, identifying a value equal to the largest number of consecutive discrete Fourier transform points for which the value of the spectral energy is essentially zero, thus defining a set of consecutive discrete Fourier transform points each having an associated magnitude and yielding, as a consequence, a width of a spectral window;
   (b) from the measured spectral characteristic, computing a sum of the magnitudes of all points in the set of consecutive discrete Fourier transform points found in the spectral window width determined in (a), and for all possible such windows;
   (c) determining the position of a set of consecutive discrete Fourier transform points, also known as the position of the spectral window, for which the sum of the magnitudes of the DFT points is a minimum; and
   (d) utilizing the amount by which the set of consecutive discrete Fourier transform points in (c) is shifted with respect to the set of consecutive discrete Fourier transform points in (a) to estimate the carrier-frequency offset.

6. A method for determining a carrier-frequency offset in an overall channel having an associated output signal and an associated gross frequency offset comprising the steps of:
   (a) transmitting, at a modulation rate of 1/T, a periodic training sequence of period MT, where M is an integer; sampling the received signal q times per modulation interval T, where q is an integer, and storing the received signal samples in a delay line of time span MT;
   (b) estimating from the stored signal samples a partial frequency-offset by using the Chevillat method;
   (c) removing the effect of the partial frequency-offset from the stored signals and computing the discrete Fourier transform of the signals from which the partial frequency-offset has been removed;
   (d) calculating an Mq-point discrete Fourier transform of equalizer coefficients obtained using the Chevillat method, thus yielding a measured spectral characteristic which is a Mq-point discrete Fourier transform of the output signal;
   (e) determining an amount of frequency shift in the measured spectral characteristic;
   (f) using the amount of frequency shift to determine a gross frequency offset and adding this gross frequency offset to the partial frequency offset determined using the Chevillat method in (b) to yield a total frequency offset; and
   (g) removing the effect of the carrier-frequency offset from an incoming signal, thus resulting in accurate detection of transmitted information.

7. A method for determining a carrier-frequency offset in an output signal of a transmission system given a partial frequency offset, by performing the steps of:
   (a) if the frequency offset is greater in absolute value than 1/(2MT), determining a gross frequency offset; and
   (b) adding the gross frequency offset to the partial frequency offset, the result being an estimate of carrier frequency offset;
   wherein the frequency shift due to the gross frequency offset is estimated by evaluating a mean-square error between the frequency characteristic computed for the overall channel and all possible characteristics obtained by successively shifting the ideal spectral characteristic by a unitary, discrete spacing until a minimum mean-square error is achieved, the number of unitary, discrete spacings away from the ideal spectral characteristic yielding an estimate of the carrier-frequency offset.

8. A method for determining a carrier-frequency offset in an output signal of a transmission system given a partial frequency offset, by performing the steps of:
   (a) if the frequency offset is greater in absolute value than 1/(2MT), determining a gross frequency offset; and
   (b) adding the gross frequency offset to the partial frequency offset, the result being an estimate of carrier frequency offset;
   wherein the frequency shift is obtained by:
   (a) from the ideal spectral characteristic, identifying a value equal to the largest number of consecutive discrete Fourier transform points for which the value of the spectral energy is essentially zero, thus defining a set of consecutive discrete Fourier transform points each having an associated magnitude and yielding, as a consequence, a width of a spectral window;
   (b) from the measured spectral characteristic, computing a sum of the magnitudes of all points in the set of consecutive discrete Fourier transform points found in the spectral window width determined in (a), and for all possible such windows;
   (c) determining the position of a set of consecutive discrete Fourier transform points, also known as the position of the spectral window, for which the sum of the magnitudes of the DFT points is a minimum; and
   (d) utilizing the amount by which the set of consecutive discrete Fourier transform points in (c) is shifted with respect to the set of consecutive discrete Fourier transform points in (a) to estimate the carrier-frequency offset.

9. The method of claim 1 wherein an equalizer is computed first, thus permitting a reliable calculation of the carrier frequency offset of the overall channel by employing an equalized characteristic.

10. The method of claim 1 wherein the frequency characteristic is a raised-cosine frequency characteristic.

11. A program storage device readable by machine, tangibly embodying a program of instructions executable by the machine to perform method steps for determining a carrier-frequency offset in an output signal of a transmission system, given an ideal spectral characteristic, the method steps comprising:
   (a) obtaining a spectral characteristic of the measured channel by using a periodic training sequence having an associated spectrum, and
   (b) determining a frequency shift in the overall channel characteristic by utilizing the amount by which the measured spectral characteristic is shifted with respect to the ideal spectral characteristic to estimate the carrier frequency offset.

* * * * *